2,019,332

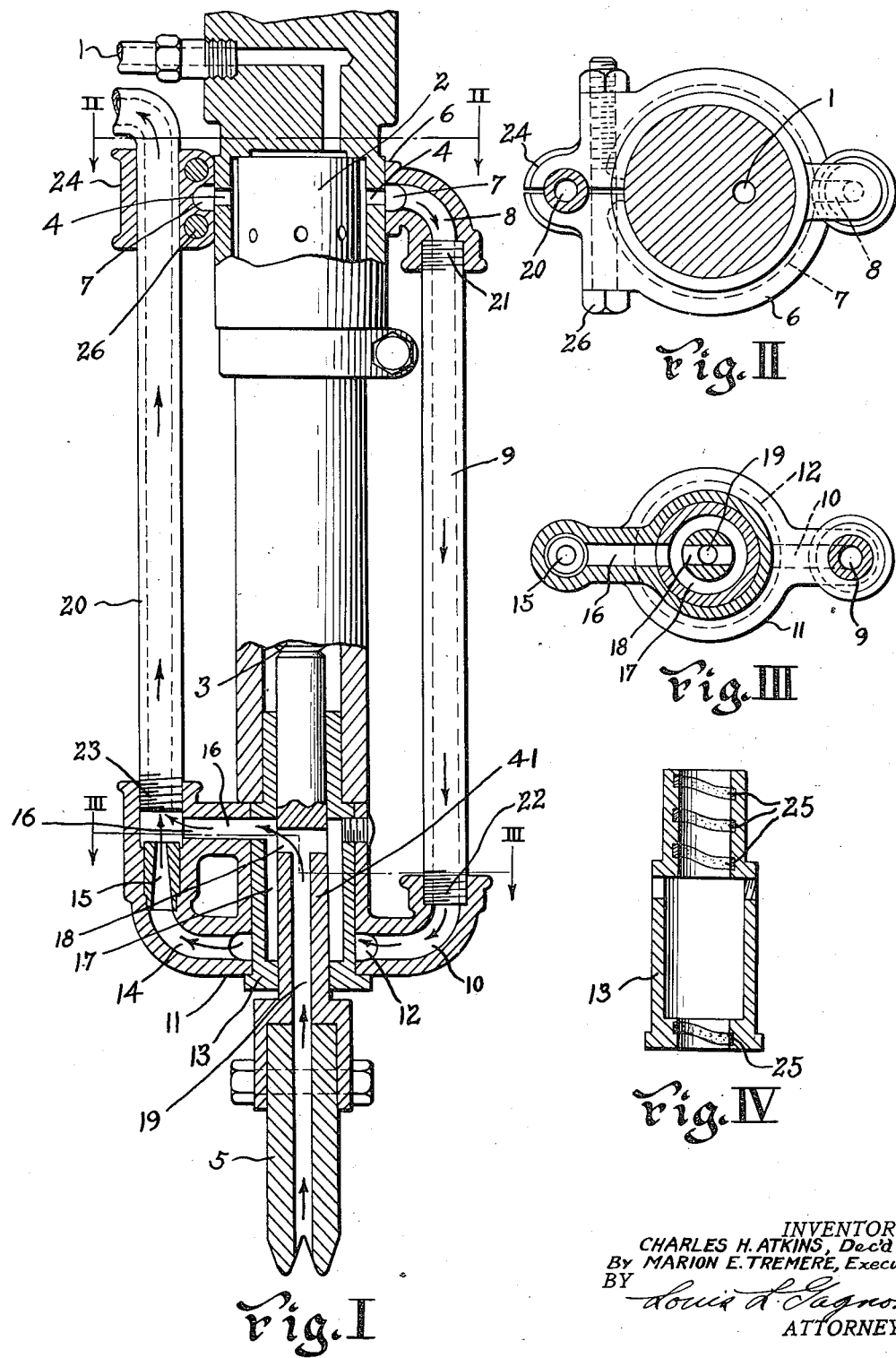
Oct. 29, 1935. C. H. ATKINS 2,019,332
PNEUMATIC TOOL
Filed July 22, 1933 2 Sheets-Sheet 1
INVENTOR
CHARLES H. ATKINS, Dec'd
By MARION E. TREMERE, Executrix.
BY
ATTORNEY Oct. 29, 1935. C. H. ATKINS 2,019,332
PNEUMATIC TOOL
Filed July 22, 1933 2 Sheets-Sheet 2
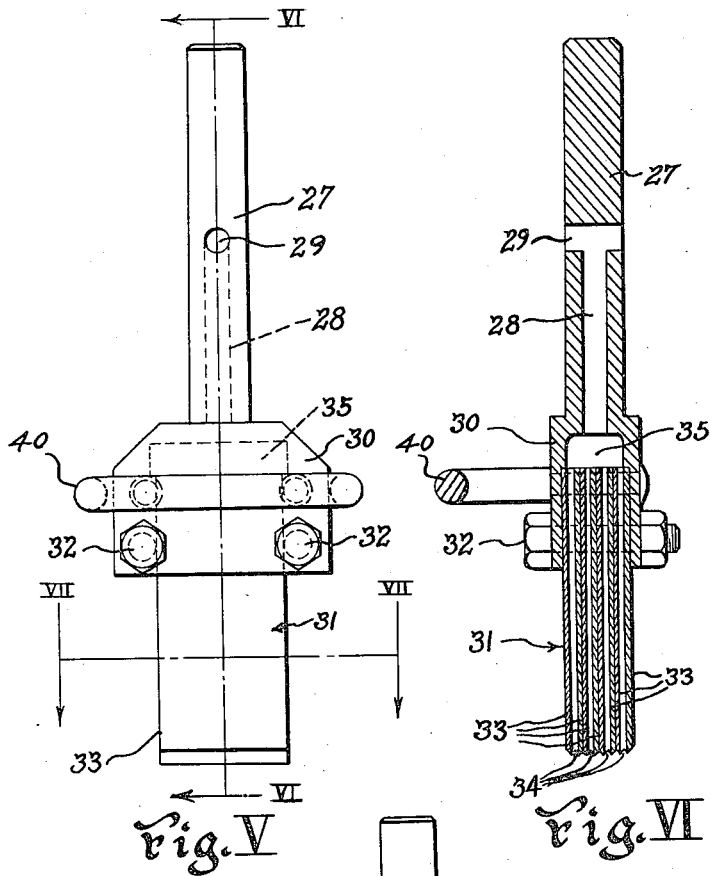
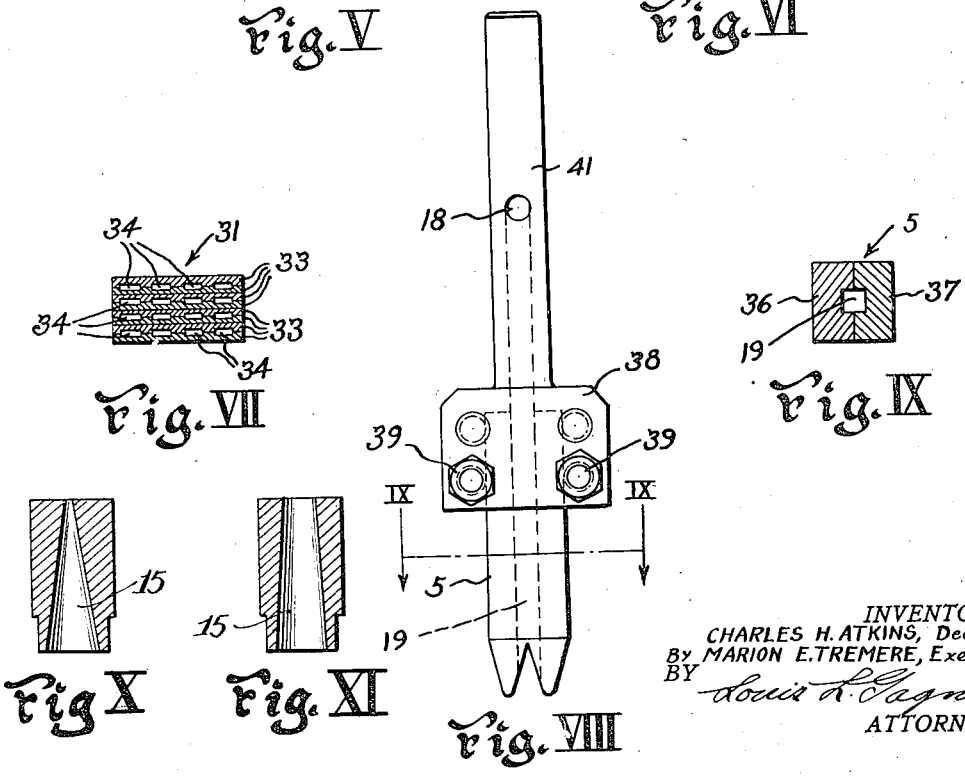
INVENTOR
CHARLES H. ATKINS, Dec'd
By MARION E. TREMERE, Executrix.
BY Louis L. Gagnon
ATTORNEY Patented Oct. 29, 1935

UNITED STATES PATENT OFFICE 2,019,332

PNEUMATIC TOOL

Charles H. Atkins, deceased, late of Palmer, Mass., by Marion E. Tremere, executrix, Palmer, Mass., assignor to Banjamin B. Tremere, Palmer, Mass.

Application July 22, 1933, Serial No. 681,744

7 Claims. (Cl. 121—10)

This invention relates to improvements in drilling and cutting devices and has particular reference to improved means and method of removing dust, cuttings, etc., formed during the use of such devices.

One of the principal objects of the invention is to provide improved means in cooperative relation with a pneumatic drill or cutter for removing dust and cuttings formed during the use of such devices.

Another object of the invention is to provide an attachment for use in cooperative relation with a pneumatic drill or cutter whereby the exhausted air coming from said drill or cutter may be utilized to remove dust and cuttings formed during the use of such devices and which will be light in weight and in compact relation with the drill or cutter and easy to handle.

Another object is to provide means in cooperative relation with a pneumatic drill or cutter whereby the exhausted air from said drill or cutter will be directed to a predetermined point near the drill wherein the speed of the current of the exhausted air will be increased and arranged to traverse an opening communicating with a channel in the drill to create a suction of air through said drill channel to draw dust and cuttings upwardly of the channel and force said dust and cuttings outwardly of an offtake hose.

Another object is to position the partial vacuum forming means near the main channel of the tool and to provide means whereby the amount of vacuum suction created may be varied.

Another object is to provide means for preventing the entrance of dust and cuttings into the tool support bearing.

Another object is to provide novel means for lubricating and preventing wear of the tool support.

Another object is to provide means for quickly and easily changing the tools when they become worn or broken and to provide an improved method of forming said tools.

Another object is to provide an apparatus which is simple and inexpensive to manufacture and which is readily applicable to standard pneumatic drilling or cutting devices now in use.

Other objects and advantages of the invention will become apparent from the following description taken in connection with the accompanying drawings and it will be apparent that many changes may be made in the details of construction, arrangement of parts, and methods shown and described without departing from the spirit of the invention as expressed in the accompanying claims. Applicant, therefore, does not wish to be limited to the exact details, arrangement of parts, and methods shown and described as the preferred forms only have been shown by way of illustration.

Referring to the drawings:

Fig. I is a side elevation of the device embodying the invention and showing portions thereof in cross section;

Fig. II is a sectional view taken on line II—II of Fig. I;

Fig. III is a sectional view taken on line III—III of Fig. I;

Fig. IV is a longitudinal sectional view of a modified form of tool support bearing;

Fig. V is a front elevation of one of the tools;

Fig. VI is a sectional view taken on line VI—VI of Fig. V;

Fig. VII is a sectional view taken on line VII—VII of Fig. V;

Fig. VIII is a front elevation of the tool shown in section in Fig. I;

Fig. IX is a sectional view taken on line IX—IX of Fig. VIII; and

Figs. X and XI illustrate two of a series of tapered ejectors having different sized ejector openings therein.

It has been usual in the past during the use of pneumatic drills or cutting machines of this nature to allow dust, cuttings, etc. to pass off in the air surrounding the operator. This dust, etc. was not only very offensive, but was very injurious to the health of the operator. The dust, chips, cuttings, etc. would also gather on the work during the use of the device and greatly hinder the progress of the operator.

It, therefore, is one of the primary objects of this invention to remove the above difficulties by preventing the dust, chips, cuttings, etc. from passing off into the air in the vicinity of the operator, and to increase the work output of the operator by keeping the work and air clean and thereby providing clear vision of the work during the use of such devices.

Referring more particularly to the drawings wherein like characters of reference designate like parts throughout the several views, the device embodying the invention is shown applied to a pneumatic hammer member of the usual prior art type. The said hammer has an air inlet 1 through which air is directed into the operating mechanism 2 to operate the hammer member 3 and has outlet openings 4 through which the air from the operating mechanism escapes during the use of the hammer. The gist of the invention is to utilize the escaping air to operate a suction device for removing dust, chips, cuttings, etc. from the air and work during the use of the drilling or cutting tool 5.

As shown in Figs. I, II, and III, a collar 6 having a channel 7 and an outlet opening 8 therein is placed over the outlet openings 4 in the pneumatic hammer and is adapted to receive the air coming from said openings 4 and direct it through a pipe line 9. The air from the pipe line 9 is directed into a passageway 10 leading into the channel 12 of a collar 11 adjacent the drilling or cutting tool 5. The channel 12 provides means by which the air may pass around the drill or cutter bearing 13 into the passageway 14. The passageway 14 is provided with a sleeve having a reduced tapered ejector opening 15 therein which increases the speed of the flow of the air passing through said opening. The air at this point passes a port 16 communicating with an open chamber 17 in the bearing 13 and an opening 18 leading from said chamber into a longitudinal opening 19 in the shank 41 and which communicates with the point of the drill or cutting tool 5. The air passing through the ejector opening 15 passes through a pipe line 20 into an offtake hose not shown. The air coming from the ejector opening 15 passes the port 16 in a direction substantially normal to the longitudinal axis of the port and thereby causes a vacuum which sucks air through the port 16, opening 18, and longitudinal opening 19, causing dust, chips, cuttings, etc. at the point of the tool to be sucked up through the channel of said tool and be forced outwardly through the pipe line 20 to be carried off by the offtake hose. This eliminates substantially entirely the dust in the atmosphere surrounding the operator, and keeps the work clean.

The amount of vacuum suction may be varied by changing the size of the tapered ejector opening 15.

Attention is directed to the fact that the pipe line 9 is threadedly connected at its opposite ends 21 and 22 to the passageways 8 and 10 and that the pipe line 20 is threadedly connected at its lower end 23 to the passageway 14 and at its upper end is held in a split support 24 on the collar 6. The said pipe lines 9 and 20 and collar members 6 and 11 are formed of a rigid light material and are placed in compact relation with the hammer so as not to hinder the use of said hammer.

If desired, as shown in Fig. IV, the bearing 13 may be provided with internal grooves 25 in which a graphite composition or other suitable means may be placed to lubricate and ease the operation of the tool and to prevent dust, dirt, etc. working up the shank and causing wear thereof during the use of the device.

The collar 6 is clamped in position on the hammer by clamp screws or other suitable means 26 and may if desired be provided with a packing to prevent the passage of air about said collar.

The tool shown in Figs. V, VI, and VII is a bush chisel type having a shank 27 formed with a longitudinal opening 28 therein and having a transverse opening 29 communicating therewith. This opening 29 is similar to the opening 18 described above. The shank 27 has an enlarged hollowed end 30 in which the bush chisel member 31 is fitted and held by the clamp screws 32. The bush chisel is preferably formed of a plurality of separate plates 33 having longitudinal grooves formed in contiguous faces thereof which when the plates are fitted together as shown in Figs. VI and VII form longitudinal openings 34 internally of the chisel. These openings 34 communicate with an open chamber 35 in the hollowed end 30 and provide means through which the dust, chips, cuttings, etc. pass. The chamber 35 communicates with the longitudinal opening 28 and provides a clear passage from the chisel point up through the shank 27. The chisel point is in constant close relation with the work during the use of the tool.

The tool shown in Figs. VIII and IX is of the tooth chisel type shown in Fig. I and is similar in structure to the chisel shown in Figs. V, VI, and VII except that it is formed of two separate pieces 36 and 37 having longitudinal grooves in the contiguous faces thereof which when the pieces 36 and 37 are fitted together form the longitudinal opening 19. The pieces 36 and 37 are held in the hollowed end 38 by the clamp screws 39.

If desired, the tools may be provided with a handle 40 as shown in Figs. V and VI, to permit ease in handling.

Although applicant has shown the vacuum forming means in cooperative relation with the shank of the tool, it may be formed internally of the tool itself, if desired, by directing the air past a port in the tool instead of the shank.

It will be understood that although applicant has shown only two different types of tools it is apparent that any type of tool may be similarly formed.

Attention is directed to the fact that in all instances the vacuum forming means should be placed in close proximity to the tool in order to prevent loss of suction and to operate efficiently and it is with this in view that applicant directs the air from the exhaust to the vacuum forming means 15 adjacent the tool end of the device. It also is of equal importance that the restricted opening 15 be reduced and made variable so that the desired suction may be obtained.

The long chamber 17 is provided so as to permit the tool to reciprocate in the bearing 13 and still allow the suction to take place through said tool. During the reciprocation of the tool the opening 18 remains in constant communication with the chamber 17. This allows dust, etc. to pass outwardly of opening 18 into the chamber 17 and from said chamber outwardly of the port 16 to be forced by the air coming through the restricted opening 15 outwardly of the offtake hose.

Applicant's device is so constructed that if the parts become clogged they may be quickly detached and cleaned.

From the foregoing description it will be seen that applicant has provided simple, efficient, and economical means and method of accomplishing all of the objects and advantages of the invention and has provided a novel method of making the tools for such devices.

Having described the invention, what is claimed is:—

1. In combination with a pneumatic hammer having an air exhaust opening adjacent one end and a longitudinal bearing adjacent its opposite end having an enlarged intermediate internal chamber, said chamber having an outlet port extending through the side wall of the hammer, a tool having a relatively long shank reciprocally mounted in the bearing and extending into the enlarged intermediate internal chamber and having a longitudinal opening therein communicating with the chamber adjacent one end and with a point adjacent the end of the tool at its opposite end, means adjacent the upper end of the hammer having a channel opening surrounding the exhaust opening, means adjacent the lower end having a channel opening surrounding the bearing and the chamber in said bearing forming air passage means about said bearing and chamber, an air passageway connecting the upper and lower channel openings for directing the exhaust air from the upper channel opening to the lower channel opening, a passageway extending from the lower channel opening transversely of the outlet port of the internal intermediate chamber and means in said passageway adjacent the outlet port for increasing the speed of the air transversely of the port to create a vacuum suction to suck dust and so forth formed at the point of the tool upwardly of the longitudinal opening in the tool, outwardly of the internal chamber and port and outwardly of the transversely extending passageway.

2. In combination with a pneumatic hammer having a main body portion formed with an air exhaust opening adjacent one end and a longitudinal bearing opening adjacent its opposite end, a separate bearing member in said bearing opening having an enlarged intermediate internal chamber, said chamber having an outlet port communicating with an aligned port in the side wall of the main body portion, a tool having a relatively long shank reciprocally mounted in the bearing and extending into the enlarged internal chamber and having a longitudinal opening therein communicating with the enlarged internal chamber adjacent one end and with a point adjacent the end of the tool at its opposite end, an upper collar having a channel opening surrounding the exhaust opening, a lower collar having a channel opening surrounding the bearing and the internal chamber adapted to form air passage means about said bearing and chamber, an air passageway connecting said channel openings for directing air from the exhaust to the lower channel opening, a passageway extending from the lower channel opening transversely of the outlet port of the side wall of the hammer and sleeve means in said passageway having a tapered opening adjacent the said outlet port for increasing the speed of the air transversely of the port to create a vacuum suction to suck dust and so forth formed at the point of the tool upwardly of the longitudinal opening of the tool, outwardly of the internal chamber and outlet ports and outwardly of the transversely extending passageway.

3. In combination with a pneumatic hammer having an air exhaust opening adjacent one end and a longitudinal bearing adjacent its opposite end having an enlarged intermediate internal chamber, said chamber having an outlet port extending through the side wall of the hammer, a tool having a relatively long shank reciprocally mounted in the bearing and extending into the enlarged internal chamber, said shank having a longitudinal opening therein extending to a point adjacent the end of the tool and a transversely extending opening communicating with the enlarged internal chamber and with the longitudinal opening, upper means having a channel opening surrounding the outlet opening, lower means having a channel opening surrounding the bearing and the chamber in said bearing forming air passage means about said bearing and chamber, an air passageway connecting the upper and lower channel openings for directing the exhaust air from the upper channel opening to the lower channel opening, a passageway extending from the lower channel opening transversely of the outlet port of the internal chamber and means in said passageway adjacent the outlet port for increasing the speed of the air transversely of the port to create a vacuum suction to suck dust and so forth formed at the point of the tool upwardly of the longitudinal opening in the tool, outwardly of the internal chamber and port and outwardly of the transversely extending passageway.

4. In combination with a pneumatic hammer having an air exhaust opening adjacent one end and a longitudinal bearing adjacent its opposite end having an enlarged intermediate internal chamber, said chamber having an outlet port extending through the side wall of the hammer, a tool having a relatively long shank reciprocally mounted in the bearing and extending into the enlarged internal chamber, said shank having a longitudinal opening therein extending to a point adjacent the end of the tool and a transversely extending opening communicating with the enlarged internal chamber and with the longitudinal opening, upper means having a channel opening surrounding the outlet opening, lower means having a channel opening surrounding the bearing and the chamber in said bearing forming air passage means about said bearing and chamber, an air passageway connecting the upper and lower channel openings for directing the exhaust air from the upper channel opening to the lower channel opening, a passageway extending from the lower channel opening transversely of the outlet port of the internal chamber and means in said passageway adjacent the outlet port for increasing the speed of the air transversely of the port to create a vacuum suction to suck dust and so forth formed at the point of the tool upwardly of the longitudinal opening in the tool, outwardly of the internal chamber and port and outwardly of the transversely extending passageway, said transversely extending opening in the shank being adapted to move longitudinally of but remaining in communication with the internal chamber during the reciprocation of the shank.

5. In combination with a pneumatic hammer having a main body portion formed with an air exhaust opening adjacent one end and a longitudinal bearing opening adjacent its opposite end, a separate bearing member in said bearing opening having an enlarged intermediate internal chamber, said chamber having an outlet port communicating with an aligned port in the side wall of the main body portion, a tool having a relatively long shank reciprocally mounted in the bearing and extending into the enlarged internal chamber, said shank having a longitudinal opening therein extending to a point adjacent the end of the tool and a transversely extending opening communicating with the enlarged internal chamber and with the longitudinal opening, an upper collar having a channel opening surrounding the exhaust opening, a lower collar having a channel opening surrounding the bearing and the internal chamber adapted to form air passage means about said bearing and chamber, an air passageway connecting said channel openings for directing air from the exhaust to the lower channel opening, a passageway extending from the lower channel opening transversely of the outlet port of the side wall of the hammer and sleeve means in said passageway having a tapered opening adjacent the said outlet port for increasing the speed of the air transversely of the port to create a vacuum suction to suck dust and so forth formed at the point of the tool upwardly of the longitudinal opening of the tool, outwardly of the internal chamber and outlet ports and outwardly of the transversely extending passageway.

6. In combination with a pneumatic hammer having a main body portion formed with an air exhaust opening adjacent one end and a longitudinal bearing opening adjacent its opposite end, a separate bearing member in said bearing opening having an enlarged intermediate internal chamber, said chamber having an outlet port communicating with an aligned port in the side wall of the main body portion, a tool having a relatively long shank reciprocally mounted in the bearing and extending into the enlarged internal chamber, said shank having a longitudinal opening therein extending to a point adjacent the end of the tool and a transversely extending opening communicating with the enlarged internal chamber and with the longitudinal opening, an upper collar having a channel opening surrounding the exhaust opening, a lower collar having a channel opening surrounding the bearing and the internal chamber adapted to form air passage means about said bearing and chamber, an air passageway connecting said channel openings for directing air from the exhaust to the lower channel opening, a passageway extending from the lower channel opening transversely of the outlet port of the side wall of the hammer and sleeve means in said passageway having a tapered opening adjacent the said outlet port for increasing the speed of the air transversely of the port to create a vacuum suction to such dust and so forth formed at the point of the tool upwardly of the longitudinal opening of the tool, outwardly of the internal chamber and outlet ports and outwardly of the transversely extending passageway, said transversely extending opening in the shank being adapted to move longitudinally of but remaining in communication with the internal chamber during the reciprocation of the shank.

7. In combination with a pneumatic hammer having an air exhaust opening adjacent one end and a longitudinal bearing adjacent its opposite end, having an intermediate internal chamber, said chamber having an outlet port extending through the side wall of the hammer, a tool having a relatively long shank reciprocally mounted in the bearing and extending into the intermediate internal chamber and having a longitudinal opening therein communicating with the chamber adjacent one end and with a point adjacent the end of the tool at its opposite end, means adjacent the upper end of the hammer having an opening communicating with the exhaust opening, means adjacent the lower end having a channel opening extending from one side of the bearing and the chamber in said bearing to the opposite side thereof and forming air passage means about said bearing and chamber, an air passageway connecting the upper and lower means having the openings therein and directing the exhaust air from the upper means to the lower means, a passageway, extending from the channel opening in the lower means transversely of the outlet port of the internal intermediate chamber, and means in said passageway adjacent the outlet port for regulating the speed of the air transversely of the port to create a vacuum suction to such dust, and so forth, formed at the point of the tool upwardly of the longitudinal opening of the tool, outwardly of the internal chamber and port and outwardly of the transversely extending passageway.

MARION E. TREMERE. [L. S.]
*Executrix of the Last Will and Testament of Charles H. Atkins, Deceased.*